Nov. 10, 1964 W. KITTEL 3,156,746
CONTACTING APPARATUS FOR RECTIFYING AND CONTACTING COLUMNS
Filed Oct. 11, 1961 5 Sheets-Sheet 2

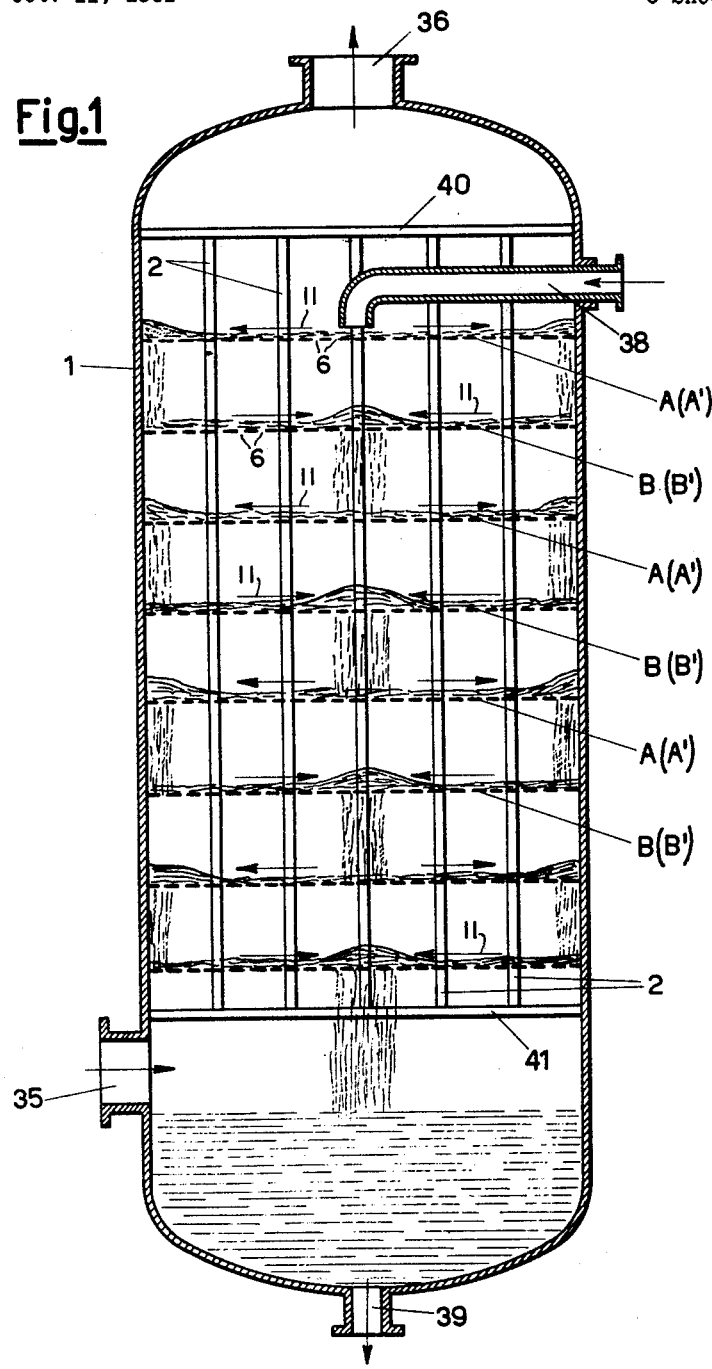

INVENTOR:
Walter Kittel

Nov. 10, 1964  W. KITTEL  3,156,746
CONTACTING APPARATUS FOR RECTIFYING AND CONTACTING COLUMNS
Filed Oct. 11, 1961  5 Sheets-Sheet 3
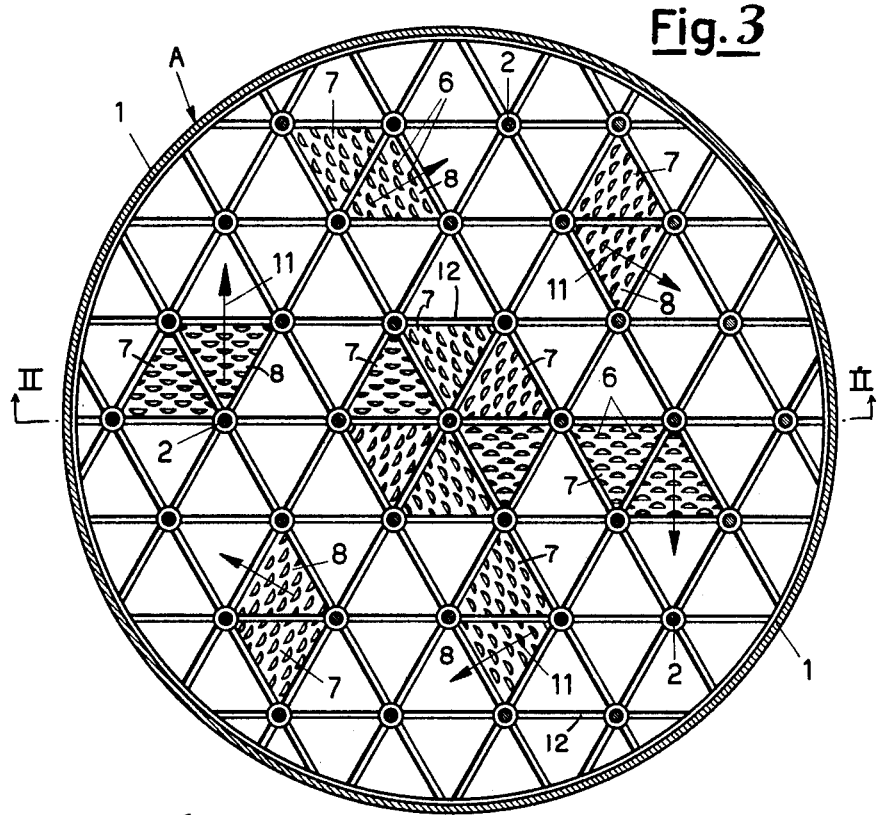
Fig. 3
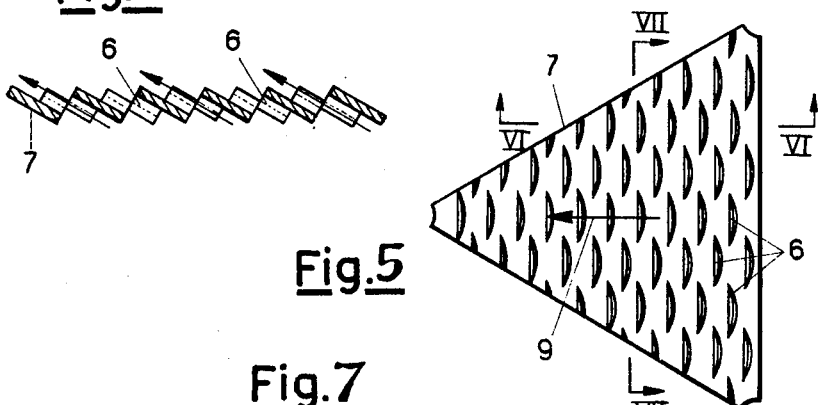
Fig. 6
Fig. 5
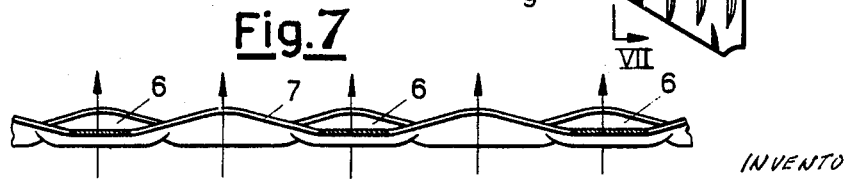
Fig. 7
INVENTOR:
Walter Kittel Nov. 10, 1964 W. KITTEL 3,156,746
CONTACTING APPARATUS FOR RECTIFYING AND CONTACTING COLUMNS
Filed Oct. 11, 1961 5 Sheets-Sheet 4

INVENTOR:
Walter Kittel

Nov. 10, 1964  W. KITTEL  3,156,746
CONTACTING APPARATUS FOR RECTIFYING AND CONTACTING COLUMNS
Filed Oct. 11, 1961  5 Sheets-Sheet 5
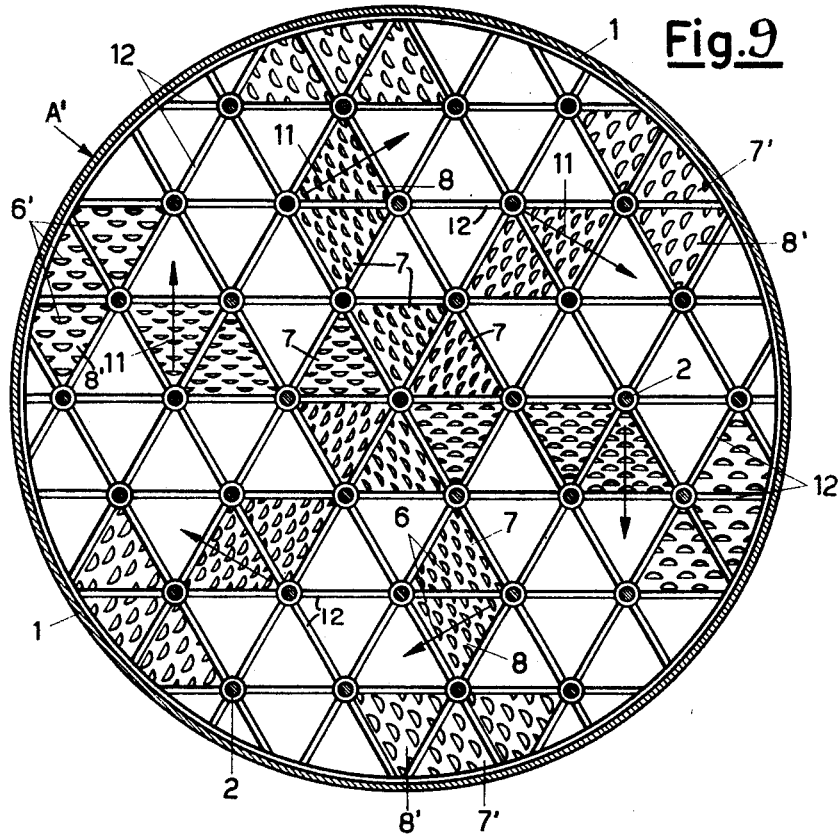
Fig. 9
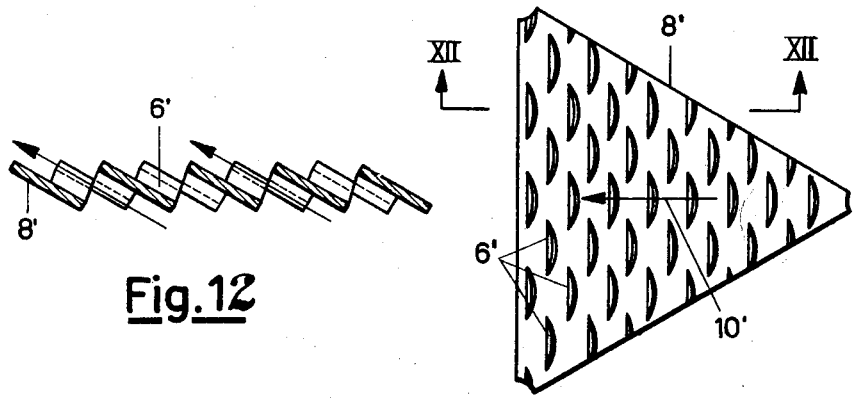
Fig. 11
Fig. 12
INVENTOR:
Walter Kittel

United States Patent Office 3,156,746
Patented Nov. 10, 1964

3,156,746
CONTACTING APPARATUS FOR RECTIFYING
AND CONTACTING COLUMNS
Walter Kittel, Gartengasse 12, Gmunden, Austria
Filed Oct. 11, 1961, Ser. No. 145,536
Claims priority, application Switzerland Mar. 7, 1952
12 Claims. (Cl. 261—114)

The invention relates to a contacting apparatus for rectifying and contacting columns in which liquid and gaseous or vaporous media are led in counter-current with respect to one another in order to bring them into intimate mutual contact.

This application is a continuation-in-part of my co-pending U.S. application Serial Number 722,353, filed March 18, 1958, since matured into U.S.A. Patent No. 3,039,752, being itself a continuation-in-part of an earlier, since abandoned application Serial Number 340,584, filed March 5, 1953.

Such contact apparatus is described for instance in my U.S.A. patent specification No. 2,568,749 and consists according to that earlier patent essentially of circular plates assembled horizontally in a cylindrical column, which are subdivided each into a certain number of sectors. In each sector there are provided a plurality of slots for gaseous flow, which lead from one surface of the sector plate to the other surface of the same plate, said slots being provided in parallel rows and their outlet apertures in each sector being inclined towards the plane of the plate in the same direction. The gas outlet apertures of the slots in the various sector plates on the contrary are inclined in different directions.

By that arrangement I have attained the purpose of having the liquid on each plate surface receive—by effect of the gases or vapors rising and passing through said flow slots in the corresponding direction—a movement of rotation about the vertical axis of the column, which may possess a prevailing centrifugal or centripetal component in accordance with the way in which the gas flow slots are directed. In the column there are assembled alternately plates whose flow slots are directed so as to make a centrifugal component prevail, and plates whose flow slots make a centripetal component prevail of the rotary movement of the liquid.

The various and numerous advantages in operation which are involved by the creation of such rotational flows of the liquid on the individual plates assembled in the column are already set forth in my said earlier patent. I wish to emphasize that by the rotation a completely uniform distribution of liquid over the whole plate surface is obtained, while on the other hand the exchange effect between the liquid on one side and the gases or vapors on the other side is substantially improved, and the formation of channels and dead zones as well as of deposits is completely avoided. Thereby the possibility is afforded of having suspended solid substances take part with the process in question. Moreover, a more intense and uniform heat input and removal are attained as a consequence of the higher rotational flow velocity and more uniform distribution. With the aid of said rotary flows, therefore, if the latter are controlled rationally, all requirements can be met which arise in the practice of many physical processes and chemical reactions.

Now it is an object of the present invention mainly to provide a contacting apparatus for rectifying and contacting columns which meets the above described functional requirements and characteristics, but affords unlimited possibility of extension also with columns having a large diameter as well as affording simplicity of assembling, disassembling and inspecting operations.

It is a further object of the invention to provide such a subdivision of the individual plates to be assembled in the column, as to afford on the one hand still a sufficiently differentiated influence upon the state of flow of the liquid on the whole plate surface as due to the gases or vapors passed through the flow slots of the plate, and on the other hand the most advantageous and simplest solution of the problems of manufacture and assembling.

It is a further object of the invention to subdivide the whole plate surface—while keeping the possibility of attaining the desired state of flow—into a plurality of individual prefabricated elements completely equal to one another, said individual elements having to be supported and fixed in the column individually so as to enable one to mount or remove them individually at will.

Moreover, it is an object of the invention to afford the possibility of a uniform heat supply and removal over the whole surface of the plates assembled in the column, again while keeping rotational flows of the liquid on the plates, as is required specially with numerous chemical reactions, for instance with the Fischer-Tropsch synthesis using a contact mass suspended in the gas.

It is an essential feature of the invention that each of the plates assembled in the column is subdivided into six sector-shaped zones, those sectors possessing each a vertex-angle of 60°. Each of those sector-shaped zones in turn is subdivided into a plurality of individual plate-shaped elements. In the column there are provided parallel to the column axis and distributed symmetrically with respect to said axis, rods or the like which serve to support individually and separately each of said individual elements in the shape of equilateral triangles, there being provided suitable means for fastening each of those elements to at least one of said rods at suitable height. If all of the individual elements are applied to the supporting members, they form within the column a plurality of substantially horizontal surfaces, said surfaces being broken by passageways permitting flow of the gases or vapors from the bottom face to the top face. The outlet apertures of said passageways or flow slots are inclined in each sector zone in equal direction with respect to the horizontal plane, while the outlet apertures of the flow slots in the various section zones are inclined in different directions.

According to one feature of one particular embodiment of the invention, the gas flow slots are provided in the shape of slots arranged seriatim parallel in said equilateral triangular plate elements, in such a way that the slot rows are, for instance, parallel to one side of the equilateral triangle. As will be set forth in detail hereinafter, in this case it is possible to compose the whole contacting apparatus to be assembled in the column, of two standard elements completely equal to each other in size and shape, said elements being distinguished from each other merely in that in one element the flow slots for the gases or vapors to be passed through, are inclined in a direction towards the vertex of the triangle, while in the other element they are inclined in a direction towards one side of the triangle.

It is quite apparent that this manner of subdivision involves great advantages, since not only does it make it possible to satisfactorily meet all flow requirements and conditions which may arise in practice, but it also renders assembling extremely simple. Moreover, it is a fact of very great significance that only two individual elements are needed to enable one to compose contacting apparatus for columns of any size. Thus, storage space is decisively reduced and short delivery time becomes possible even for installations which have to meet the greatest variety of requirements and conditions.

The subdivision, according to the present invention, of the plates assembled in the column into six sectors of equal size and the further subdivision of said sectors into a number of substantially equilateral triangular plate elements involves not only the above-mentioned advantages in assembling and manufacturing, but also has proved to be particularly advantageous as to the desired effect of causing rotational flows. As already mentioned above in my earlier U.S.A. patent specification No. 2,568,749, a subdivision of the plates into sector-shaped zones was proposed, that is, it had already been recognized that to attain the rotational flow it was not absolutely indispensable to arrange the gas flow slots in the plate in completely regular distribution around the center, but that it suffices to arrange the flow slots in the individual zones parallel seriatim, so that the gases or vapors passing through the slots leave in the same sense of rotation and act upon the liquid in the same direction. On the other hand, it is apparent that with a division of the plates into only a few sector-shaped zones, as for instance into three or four zones, it is no longer possible to cause the state of flow to be influenced in so differentiated a manner. However, since such differentiated state of flow is required in the majority of cases, the exchange effect becomes seriously prejudiced.

It has been found, according to the invention, that the proposed division into six sectors affords sufficient "fineness" to enable influencing of the state of flow through the plate in the desired way, and that this division in the manner hereinbefore set forth is particularly suited for further subdivision into equilateral triangular elements. Hence, as has been found in practice, this is the most favorable solution of compromise between the requirements of manufacture and assembling, in particular for columns of great diameter.

Also with the plates composed according to the invention of triangular individual elements and assembled in a column, the liquid led in countercurrent to the rising gases or vapors is made to drip, in a manner known per se, through the flow slots for said gases or vapors. With plates whose flow slots are so directed that the rotary movement of the liquid possesses a prevailingly centrifugal component, the liquid is automatically brought to the plate border and there drips through said flow slots. On the contrary, with the subsequent plate, there prevails a centripetal component of rotational flow, and the liquid drips through said flow slots at the middle zone.

The subdivision of the plates according to the invention into individual elements now affords also the great advantage of favoring this dripping of the liquid in a very simple manner if zones with flow slots having different sizes are provided in the plates. Where the liquid must drip in the middle, a middle zone is provided which is formed of equilateral triangular elements having larger flow slots, while with plates in which the liquid has to drip at the border, an analogous border zone is provided. The individual elements of which the plates are composed are also in this case all of the same size and shape for the composing of the contacting apparatus to be assembled in the column.

In this case two pairs in lieu of one pair of individual triangular elements are needed, said two pairs having flow slots of different sizes with respect to each other. Such an embodiment of the contacting apparatus would meet with considerable difficulties in manufacture and assembly without a subdivision of the plates into individual elements, even if the plates were divided into sector-shaped zones. Those difficulties have been completely eliminated by the present invention.

Further objects and features of the invention are set forth more in detail hereinafter with reference to the drawings, in which there are represented various embodiments.

FIG. 1 is a schematical vertical section taken through an entire column according to the invention in which there are assembled plates according to FIGS. 3 and 4 or FIGS. 9 and 10;

FIGS. 3 and 4 are horizontal sections taken along the lines III—III and IV—IV, respectively, of FIG. 2;

FIG. 5 shows one of the triangular plate elements of which the plates of FIGS. 2-4 are composed;

FIGS. 6 and 7 are sections of the plate elements taken along the lines VI—VI and VII—VII, respectively, of FIG. 5;

FIGS. 9 and 10 are representations similar to those of FIGS. 3 and 4, but with triangular plate elements having larger flow slots and arranged in zones;

FIG. 11 is a representation corresponding to FIG. 8 of such a triangular element with larger flow slots; and FIG. 12 is a section taken along line XII—XII of FIG. 11.

Figure 4:
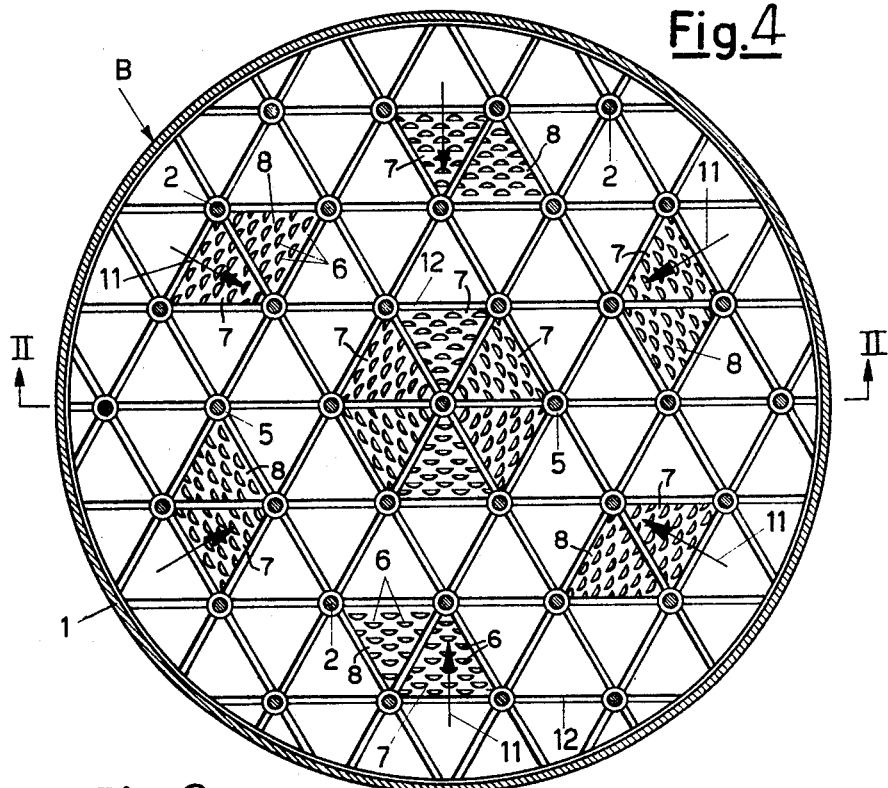

The drawings illustrate the invention only schematically, without going into constructive details in particular.

In FIG. 1 a contacting column is shown in vertical section, in which a liquid passed from top to bottom is to be brought into intimate mutual contact with gases or vapors rising from bottom to top. The column has a jacket 1 of cylindrical shape. In the proximity of the upper end a pipe 38 is introduced from the side and reaches as far as the middle of the column. Through that pipe 38 the liquid is supplied. At the bottom end of the column there is provided a central discharge 39 for the liquid. The gases or vapors are fed at the bottom through a lateral inlet channel 35 and are discharged at the top through a central discharge channel 36. Within the column jacket 1 there are provided a number of vertical rods 2 parallel to the longitudinal axis of the column and symmetrically positioned with respect thereto, between two supporting structures indicated schematically as 40, 41, said rods 2 representing in plan the vertices of equilateral triangles.

Figure 2:
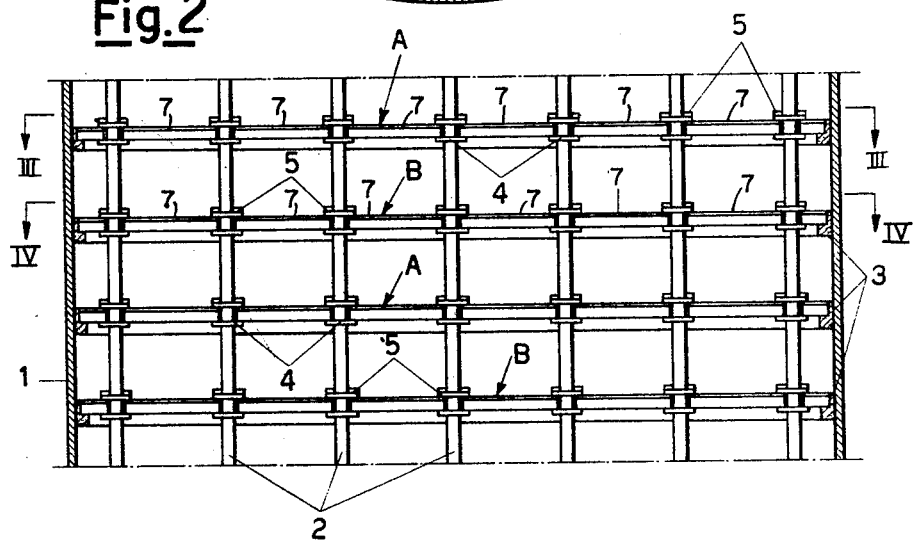
FIG. 2 shows part of a column with four plates assembled above one another, in a vertical section taken along the lines II—II of both FIGS. 3 and 4.

As appears from FIG. 2, at the inner side of the column jacket 1 there are fastened at certain heights supporting rings 3 and at equal height therewith, at the rods 2, supporting flanges 4. The flanges 4 and rings 3 serve to support triangular elements of the kind shown in FIGS. 5 and 8. With the aid of flanges 5 the triangular plates are fastened at their ends, and it will be seen that each individual plate is supported separately so that it can be assembled and disassembled individually. The triangular elements form plates which are subdivided into six sector-shaped zones around the central vertical axis of the contacting apparatus.

Figure 8:
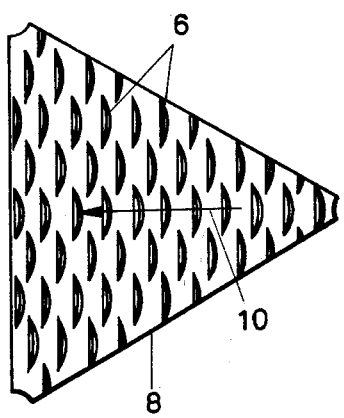
FIG. 8 shows the second triangular element composing the plates shown in FIGS. 2-4.

The contact plates assembled in the column jacket 1 are composed in the instant case of two kinds of individual elements. These elements have—as may be seen in FIGS. 5 and 8—precisely the same size and shape; they are equilaterally triangular and have somewhat inwardly rounded vertices so as to adapt themselves to the rods 2 when assembled. The entire surface of these triangular plates is permeated by flow slots 6 positioned parallel in rows. The rows of these slots 6 are parallel to one side of the plate and the individual slots lead obliquely from the bottom face of a plate to the top face of the same plate (see in particular FIG. 6). The two kinds of triangular plates are distinguished from one another exclusively in that in one type of plate 7 (FIG. 5) the flow slots 6 are inclined in a direction towards the vertex of the triangular element which is opposite the side to which the rows of slots are parallel, while in the other kind of plate 8 (FIG. 8) the flow slots 6 are inclined in a direction towards the side of the triangular element to which the rows of slots are parallel. The direction of passage (flow) of the gases or vapors made to pass through the triangular plates 7 or 8 is the same for all of the slots 6 of each plate and is indicated in FIGS. 5 and 8 by the arrows 9 and 10, respectively. Thus, the arrows shown in FIGS. 6 and 7 indicate the direction of flow of the gases or vapors through the slots 6.

The standardized plate elements 7, 8 are preferably made of expanded metal and are cut out from large sheets of such material. Because of the standardized and equal dimensions there results practically no waste.

The plate elements 7, 8 are assembled in the column (FIG. 2) in such a manner as to alternately form surfaces A according to the representation of FIG. 3 and surfaces B according to the representation of FIG. 4. In the representations of FIGS. 3 and 4, only some of the plate elements 7, 8 are shown with their slots 6. It should be understood, however, that all of the elements possess such slots 6.

In FIG. 3 there is shown a plate A constituted by elements 7, 8, said elements 7, 8 being so arranged that the gases or vapors rising through the slots 6 cause rotation of the liquid finding itself on said plate, in a clockwise direction about the plate center. As shown in FIG. 3, the plate elements 7, 8 are assembled in six sectors, the slots 6 being arranged in each sector in parallel rows so that the direction of flow or passage of the gases or vapors is the same in each sector for all of the elements 7, 8. The arrows 11 indicate this direction of gas flow or passage for each sector. In adjacent sector, the directions of flow or passage of the gases or vapors are rotated, respectively, by 60° with respect to each other. With the arrangement of FIG. 3 there results a preferred centrifugal direction of flow of the gases or vapors through the slots 6 of the elements 7, 8 and, thereby, a rotary movement of the liquid.

In FIG. 4, in contradistinction, there is shown the arrangement for a plate B above or below the plate A of FIG. 3. This plate is also composed of the same triangular elements 7, 8 which again are assembled in six sectors, but are now placed so that the direction of flow of the gases or vapors through the slots 6 of the elements 7, 8 is centripetal for each sector. The liquid on the plate B, therefore, is moved in this case towards the center by the rising gases or vapors.

In this manner the over-all result is that the liquid, passed in the column of FIG. 1 from top to bottom, is put into rotation by the rising gases or vapors on one plate A according to FIG. 3, and is urged towards the middle on a plate B according to FIG. 4 (see the arrows 11), so that a dripping of the liquid from one plate to the subsequent one below can take place through the slots 6, namely, in the former case at the plate periphery and in the latter case at the middle of the plate.

This dripping of the liquid may be further favored in particular cases by providing individual elements with larger slot apertures, at the plate periphery in the former case and at the middle of the plate in the latter case. Such a plate element, which also is triangular and equilateral, is represented in FIG. 11 as element 8'. It corresponds—as to its dimensions—completely to the plate elements 7, 8 of FIGS. 5 and 8, except, as shown in the drawing, that the apertures of the slots 6' are larger than those of the slots 6 of the plate elements 7, 8. The element 8' shown in FIG. 11 corresponds, as to the inclination of its slots 6' (form the vertex towards the opposite side according to the arrow 10'), to the element 8 in FIG. 8. It should be also understood that there may be provided an element 7' with larger slot apertures, corresponding to the element 7 of FIG. 5.

In FIG. 9 there is represented a plate A' which corresponds to the plate A of FIG. 3 and is composed of individual elements 7, 8 having smaller slot apertures as well as of individual elements 7', 8' with larger slot apertures. In plate A' the individual elements are again assembled in six sectors, the slots 6 or 6' of all elements being arranged in parallel rows. The direction of flow created is such that a clockwise rotation of the liquid is effected. In each sector there are provided at the periphery a number of individual elements 7', 8' with larger slot apertures, and those elements form in their entirety an external zone wherein the dripping of the liquid through the larger slots 6' is favored.

Figure 10:
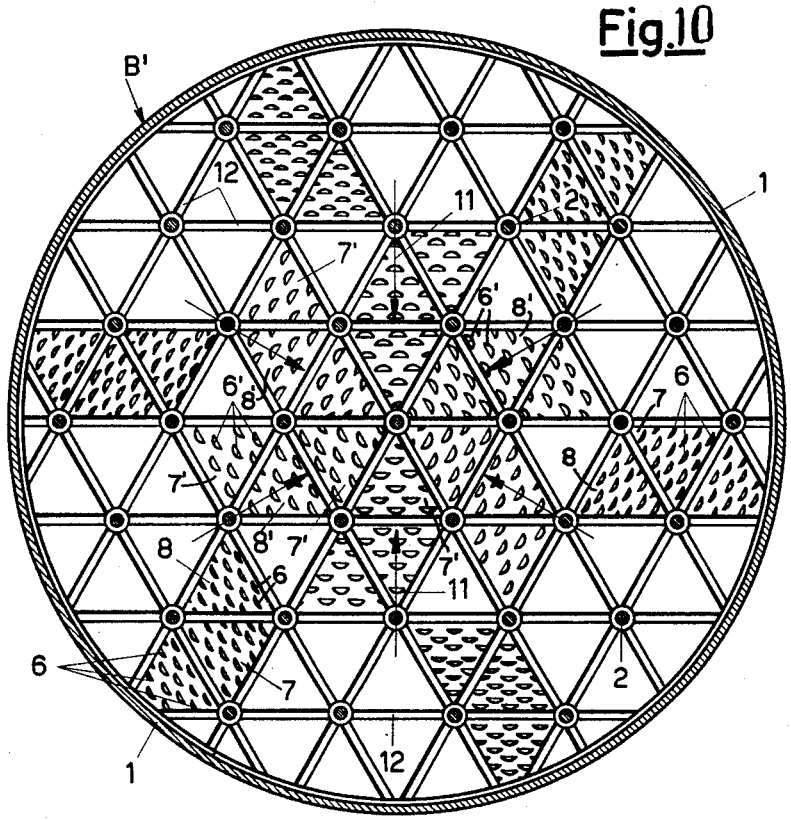

FIG. 10, on the contrary, shows a plate B' corresponding to the plate B of FIG. 4, wherein the individual elements 7', 8' with larger slot apertures 6' are assembled and arranged in one zone in the middle. Except for this arrangement, the plate B' corresponds completely to that of plate B of FIG. 4.

The plates A', B' can be assembled in a column according to FIG. 1 in the same way as plates A, B.

It should also be noted that the lap joints between the adjacent individual plates of all of the embodiments described are covered by T-shaped profile battens 12 (FIGS. 3, 4, 9 and 10) which are inserted between the triangular elements after assembling the latter.

Moreover, it should be noted that the sides of individual elements 7, 8, 7' and 8', which are used for the border zones, are rounded in accordance with the curvature of the column jacket 1, so as to attain perfect sealing.

While in the embodiment as represented and described hereinbefore the supporting rods 2 (FIG. 1) for the individual plate elements have been recited as solid rods, it should be obviously understood that it is quite possible and easy to employ pipes in lieu of rods, thus providing a means, if needed, for supplying or removing heat being circulated through said pipes.

In this case FIG. 1 of the present disclosure would somewhat resemble FIG. 1 of the parent application Ser. No. 722,353, now U.S.A. Patent No. 3,039,752, wherein the upper supporting structure carries a plurality of pipes projecting vertically downwards and adapted to include each a concentrical inner pipe for the circulation of a heat-exchange medium. The open ends of the inner pipes are somewhat above the closed ends of the outer pipes. In a manner fully described and illustrated in the above-mentioned parent application, the interior of the inner pipes as well as the interspace between the two pipes is connected to suitable apertures on the contacting apparatus for feeding and discharging of a heating or cooling medium.

The plate elements being secured to the outer pipes, proper heat transfer is thus achieved between these elements.

It should be understood, of course, that the foregoing disclosure relates only to preferred embodiments of the invention and that it is intended to cover all changes and modifications of the examples described which do not constitute departures from the spirit and scope of the invention as set forth in the appended claims.

I claim:

1. In a rectifying and contacting column having a vertical substantially cylindrical wall, means for introducing a liquid at the top end and for discharging said liquid at the bottom end of said column, and means for introducing gases and vapors from the bottom and for discharging said gases and vapors at the top of said column: a contacting apparatus comprising a number of superposed spaced insert trays each occupying the entire cross-section of said column, said liquid passing over substantially the entire surface of each of said trays while descending to said bottom, each of said trays being subdivided into six sector-shaped zones, each of said zones forming a vertex angle of 60° and being in turn subdivided into a plurality of individual plate-shaped substantially equilateral, horizontally disposed triangular elements; a plurality of supporting members arranged parallel to and symmetrically with respect to the vertical axis of said column; means for fastening the corners of each of said triangular elements to said supporting members; said supporting members extending from the bottom to the top of said column for supporting all of said trays; each of said triangular elements defining in their body a plurality of uniformly angular passages for uniformly angular flow of gas, said passages having different angular directions in each of said zones within the horizontal plane of said trays, and said directions being rotated by 60° with respect to one another in adjacent ones of all

triangular in shape and removably supported by said members.

References Cited in the file of this patent

UNITED STATES PATENTS

| | | |
|---|---|---|
| 2,475,025 | Huff | July 5, 1949 |
| 2,568,749 | Kittel | Sept. 25, 1951 |
| 2,619,336 | Schilling | Nov. 25, 1952 |
| 2,940,733 | Umbricht | June 14, 1960 |

FOREIGN PATENTS 1,011,583  France _____ Apr. 2, 1952
(Corresponding U.S. Patent No. 2,804,292, Aug. 27, 1957)

OTHER REFERENCES

"Spiral Flow for Better Distillation," Petroleum Processing, April 1953, pages 556 to 559.